United States Patent [19]

Noens et al.

[11] Patent Number: 4,626,830

[45] Date of Patent: Dec. 2, 1986

[54] MEMBRANE KEYBOARD WITH IDENTIFYING CONNECTORS

[75] Inventors: Richard H. Noens, Arlington Heights; Leonard E. Russell, Algonquin, both of Ill.

[73] Assignee: Motorola, Inc., Schaumburg, Ill.

[21] Appl. No.: 622,028

[22] Filed: Jun. 18, 1984

[51] Int. Cl.[4] .......................... G06F 3/02; H04M 1/26

[52] U.S. Cl. .......................... 340/365 VL; 340/365 R

[58] Field of Search ........ 340/365 VL, 365 R, 365 S, 340/365 C, 711, 712; 178/17 C; 200/5 R, 5 A; 235/61 R, 145 R, 145 A; 400/477, 478, 479; 364/700, 709

[56] References Cited

U.S. PATENT DOCUMENTS

| | | | |
|---|---|---|---|
| 3,971,925 | 7/1976 | Wenninger et al. | 364/900 |
| 4,030,094 | 6/1977 | Anderson | 340/365 VL |
| 4,336,529 | 6/1982 | Buan | 340/365 R |
| 4,456,972 | 6/1984 | Lee et al. | 364/900 |
| 4,516,112 | 5/1985 | Chen | 340/712 |
| 4,545,010 | 10/1985 | Salas et al. | 364/200 |

OTHER PUBLICATIONS

M. Flinders—IBM Technical Disclosure Bulletin—vol. 24, No. 12, May 1982—p. 6231.

*Primary Examiner*—John W. Caldwell, Sr.
*Assistant Examiner*—Mahmoud Fatahi-yar
*Attorney, Agent, or Firm*—Steven G. Parmelee

[57] ABSTRACT

A membrane keyboard is provided having a first and second plurality of connectors extending therefrom. The first plurality of connectors is attached at one end to a number of switches on the keyboard and at the other end to a processing circuit apart from the keyboard. One end of the second plurality of connectors is also connected to the processing circuit. A third set of connectors is utilized to connect the ends of the second plurality of connectors on the keyboard in a manner to identify the keyboard to the processing circuit.

6 Claims, 2 Drawing Figures

| | A | B | C | D |
|---|---|---|---|---|
| 1 | REF | REF | — | — |
| 2 | REF | — | REF | — |

MEMBRANE KEYBOARD WITH IDENTIFYING CONNECTORS

BACKGROUND OF THE INVENTION

The present invention relates to a membrane keyboard assembly, and more particularly to a membrane keyboard having connectors to a processing circuit whereby the desired functions of the membrane keyboard can be identified to the processing circuit.

In the control circuit of a device such as a microwave oven or a computer terminal, a pressure sensitive membrane switchboard or keyboard is frequently utilized to transfer the functions desired by the operator to a microprocessor control circuit. By pressing the desired indicia bearing area of the membrane keyboard, appropriate switching occurs and the microprocessor in turn instructs the device being controlled to perform the desired function. In such devices such as microwave ovens and computers, the microprocessor control circuit is a relatively expensive and difficult to design assembly. Once a proven assembly is designed and accepted by customers for its reliability, it is not desirable to change such a design. However, for various models of the devices being controlled, such as microwave ovens, it is desirable to have an increasing number of controllable functions indicated by the indicia on the membrane keyboard for different models of the products. Accordingly, it is desirable to be able to use this same microprocessor control circuit for the various models of the product, even though these models will have different membrane keyboard assemblies allowing for increased or differing numbers of controllable functions.

One known method of identifying the particular type of indicia bearing membrane keyboard being connected to the particular microprocessor control circuit is to utilize a dual in line digital control switch in the control circuitry. Such switch includes a plurality of digital switches each of which can be thrown in a positive or negative connection configuration thereby providing a coding signal to the control circuitry. Each type of membrane keyboard to be connected to the control circuitry can be identified by a particular code, and thereby the one particular control circuit can accommodate a number of membrane keyboards. This method is not desirable from a cost point of view as such digital switches add a considerable cost to the control circuitry. Further, if one of the switches was incorrectly thrown, upon the assembly of the device or in the use of the device, incorrect control of the device by the membrane keyboard would result.

Another known method of identifying the type of membrane keyboard being connected to the control circuit is to hard wire jumpers usually comprising resistors at particular locations on the control circuit board. The control circuit board is so designed so as to be able to identify the type of membrane keyboard being connected thereto by the coded connection of such jumper elements. Such connections to the control circuit board are undesirable as they usually require separate elements to be connected to the circuit board which, as mentioned above, is desired to be a fully functional and reliable circuit assembly without any changes.

Accordingly, it is an object of the present invention to provide a membrane keyboard having identifying connectors whereby the processing circuit to which it is connected can be told the type of membrane keyboard being so connected.

SUMMARY OF THE INVENTION

The present invention provides a membrane keyboard having a first and second plurality of connectors extending therefrom. The first plurality of connectors is attached at one end to a number of switches on the keyboard and at its other end to a processing circuit apart from the keyboard. The keyboard switch structure usually includes an upper conductive member on a film which is forced downward by operator pressure to connect with contacts on the bottom member. The connectors usually comprise a printed pattern of conductors on a plastic film extending between the keyboard and the processing circuit. A second plurality of similarly constructed connectors also extends between the membrane keyboard and the processing circuit. One end of the second plurality of connectors are connected to the processing circuit and the other end of the second plurality of connectors are connected at the membrane keyboard. A third set of connectors connects the ends of the second plurality of connectors on the keyboard in a coded manner to identify the keyboard to the processing circuit.

Such identifying connection by the third set of connectors at the membrane keyboard usually comprises a screened conductive pattern joining certain of the second plurality of connectors extending to the membrane keyboard. One method of such coding is to have one of the second plurality of connectors carry a reference voltage from the processing circuit. Such reference voltage can then be connected to one or more of the remaining second plurality of connectors by the third set of connectors in a desired configuration to provide the necessary coding to the processing circuit. Another method is to have certain of the second plurality of connectors each carry a discrete voltage from the processing circuit. Appropriate connection of the third set of connectors to the ends of the second plurality of connectors at the membrane keyboard can provide the necessary coding to the processing circuit to identify the particular membrane keyboard.

Where the second plurality of connectors comprises N lines plus one reference line, the interconnection of the end lines with each other and with the reference potential line will give $2^N$ possibilities of coding connections to the processing circuit. For example, where N equals 2, one line can be connected to the reference potential while the other line is connected to the reference potential providing a first possibility; the first line can be connected to the reference potential while the second line is not connected to the reference potential, providing a second possibility; the first line could not be connected to the reference potential while the second line is connected to the reference potential, providing a third possibility, and both lines could not be connected to the reference potential providing a fourth possibility. Note that $2^N$ where N equals 2 gives the four possibilities outlined herein.

In particular, the present invention provides a control circuit comprising a membrane switch board having a first plurality and a second plurality of contact leads extending from said membrane switch board, a processing circuit having said first and second plurality of contact leads connected thereto, and a third set of contact leads on said membrane switch board, said third set of contact leads connecting selected ones of said second plurality of contact leads in a manner so as to identify to said processing circuit the type of membrane switch board connected thereto.

The present invention also provides a membrane switch connection circuit comprising a membrane switch board having a plurality of switches, a first plurality of contact leads connected to certain of said switches and extending from said membrane switch board, a second plurality of contact leads on said membrane switch board and extending therefrom, a processing circuit having said first and second plurality of contact leads connected thereto, a third set of contact leads on said membrane switch board connecting certain of said second plurality of contact leads to identify said membrane switch board to said processing circuit.

DETAILED DESCRIPTION OF THE PREFERRED EMBODIMENT

Figures 1, 2:
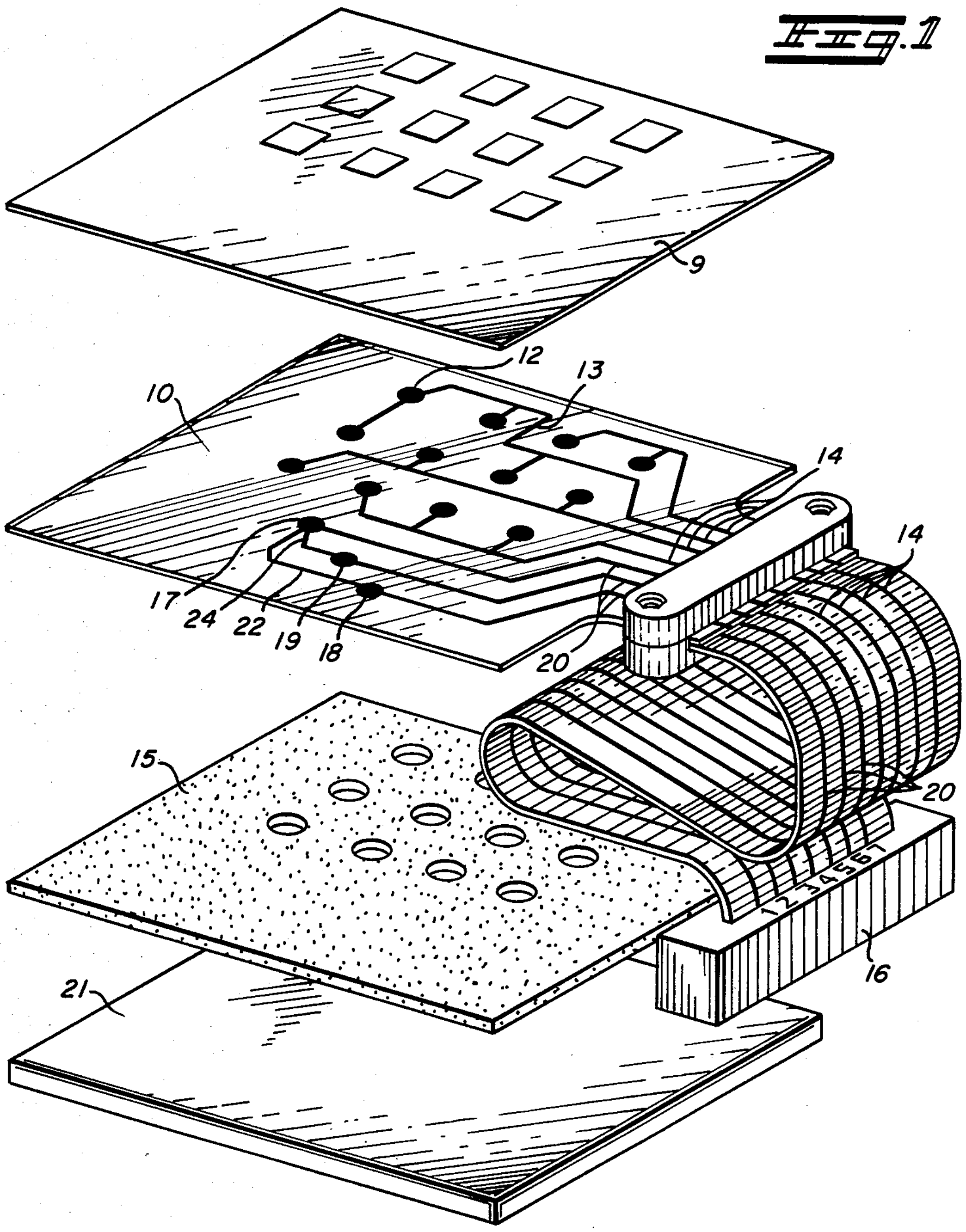
FIG. 1 is a perspective view of a membrane keyboard, connectors and processing circuit connection in accordance with the present invention.
FIG. 2 is a table of the four possible connections of two connectors with a reference potential.

Referring now to FIG. 1, a top indicia bearing layer 9 is provided. A membrane keyboard is shown generally at 10, comprising a plurality of contact switches 12. Contact switches 12 are interconnected by a desired pattern of conductors 13 which terminate in a plurality of contact leads or connectors 14 extending from keyboard 10. Connectors 14 extend to processing circuit pin connector 16 wherein each conductor is terminated in an appropriate pin position. A spacer layer 15 is provided having apertures permitting the contact of normally open contact switches 12 with the conductor surface of fourth layer 21, thereby completing the contact upon the application of pressure to the appropriate top layer indicia.

A second series of leads or conductors 20 also runs between membrane keyboard 10 and processing circuit pin connector 16. The first such conductor has a contact 17 on keyboard 10 and extends to position 3, a reference potential, on pin connection 16. Another such conductor has terminal 19 on keyboard 10 and extends to position 2 on pin connector 16. A third such conductor includes terminal 18 on keyboard 10 and extends to position 1 on pin connector 16.

A third set of conductors is present on membrane keyboard 10. Conductor or lead 22 provides connection between terminals 17 and 18 on keyboard 10, thereby providing connection between pin position 1 and pin position 3, or the reference potential, on pin connector 16. Conductor or lead 24 is shown as providing connection between terminals 17 and 19 on keyboard 10, thereby providing connection between pin 2 and pin 3 (or the reference potential) on processing circuit pin connector 16. It should be understood that conductors 22 and 24 need not be present at the same time, thereby allowing either pin connection 1 to be connected to the reference potential or pin connection 2 to be connected to the reference potential on pin connector 16. Further, if neither conductor 22 nor conductor 24 is present, pin positions 1 and 2 remain independent and unconnected to the reference potential.

Referring now to FIG. 2, the four possible connection configurations discussed are set forth in table form. In possible connection A, both pins 1 and 2 are connected to the reference potential. This would mean that both conductors 22 and 24 would be present on keyboard 10. In possible connection configuration B, only pin 1 would be connected to the reference potential, and referring to FIG. 1, conductor 24 would not be present. In connection configuration C, only pin 2 would be tied to the reference potential, and referring to FIG. 1, conductor 22 would not be present. In connection configuration D, neither pin 1 nor pin 2 would be tied to the reference potential, and referring to FIG. 1, neither conductor 22 nor 24 would be present.

Note that in the configurations outlined above, for a two conductor plus one reference conductor connection, four possibilities of connections are present. In general terms, $N+1$ conductors result in $2^N$ connection possibilities.

What is claimed is:

1. In a membrane keyboard for use with a microprocessor, which microprocessor can be used with a plurality of different membrane keyboards provided that said microprocessor can identify which membrane keyboard is being used, and wherein the membrane keyboard includes:

a film having a plurality of contact switches formed thereon;

an indicia bearing layer disposed over said film;

a plurality of conductors formed on said film, each of said conductors having one end connected to at least one of said contact switches and a second end terminating in a contact lead;

a pin connector that can be operably connected to electrically interface with said microprocessor; and a connector that electrically connects said contact leads of said plurality of conductors to said pin connector to thereby allow data input through said plurality of contact switches to be transmitted to said microprocessor;

an improvement comprising:

at least a first and second additional conductor formed on said film, which first and second additional conductors connect to said pin connector through said connector, wherein said first additional conductor connects to receive a reference voltage, such that said microprocessor can identify said membrane keyboard by determining whether said first and second additional conductors are electrically connected together by monitoring whether said reference voltage appears on said second additional conductor.

2. The improvement of claim 1 and further including a third additional conductor formed on said film, which third additional conductor connects to said pin connector through said connector, such that said microprocessor can identify said membrane keyboard by determining whether said first additional conductor connects to said second and third additional conductors by monitoring whether said reference voltage appears on said second and third additional conductors.

3. The improvement of claim 2 wherein said first additional conductor is not electrically connected to said second additional conductor and is not electrically connected to said third additional conductor.

4. The improvement of claim 2 wherein said first additional conductor is electrically connected to said second additional conductor but not to said third additional conductor.

5. The improvement of claim 2 wherein said first additional conductor is electrically connected to said third additional conductor but not to said second additional conductor.

6. The improvement of claim 2 wherein said first additional conductor is electrically connected to both said second addtional conductor and said third additional conductor.

* * * * *